United States Patent [19]
Morrow

[11] 3,847,177
[45] Nov. 12, 1974

[54] SAFETY FLOAT VALVE

[76] Inventor: Lorin Lee Morrow, Box 2033, Bayard, N. Mex. 88061

[22] Filed: May 18, 1973

[21] Appl. No.: 361,564

[52] U.S. Cl................ 137/400, 137/426, 137/437, 137/444, 137/451
[51] Int. Cl............................................ F16k 31/24
[58] Field of Search........... 137/400, 411, 426, 429, 137/430, 433, 434, 436, 437, 442, 444, 445, 448, 451

[56] References Cited
UNITED STATES PATENTS

| | | | |
|---|---|---|---|
| 655,233 | 8/1900 | Heuck | 137/444 X |
| 715,726 | 12/1902 | Wright | 137/400 |
| 921,131 | 5/1909 | Lohman | 137/442 X |
| 1,744,559 | 1/1930 | Locke | 137/437 |
| 2,212,303 | 8/1940 | Ruskamp | 137/448 X |
| 2,292,407 | 8/1942 | Skerritt | 137/426 |
| 2,803,262 | 8/1957 | Shellenberger | 137/400 |

Primary Examiner—William R. Cline
Assistant Examiner—David R. Matthews
Attorney, Agent, or Firm—Victor J. Evans & Co.

[57] ABSTRACT

A safety float valve for maintaining the desired water level in a trough or tank having a safety shut-off utilizing a separate ball valve for closing the outlet pipe should the float sink or the tank rupture to permit all of the water to flow therefrom. The device is used with any desired tanks or watering troughs in which it is desired to maintain a relatively constant water level.

5 Claims, 3 Drawing Figures

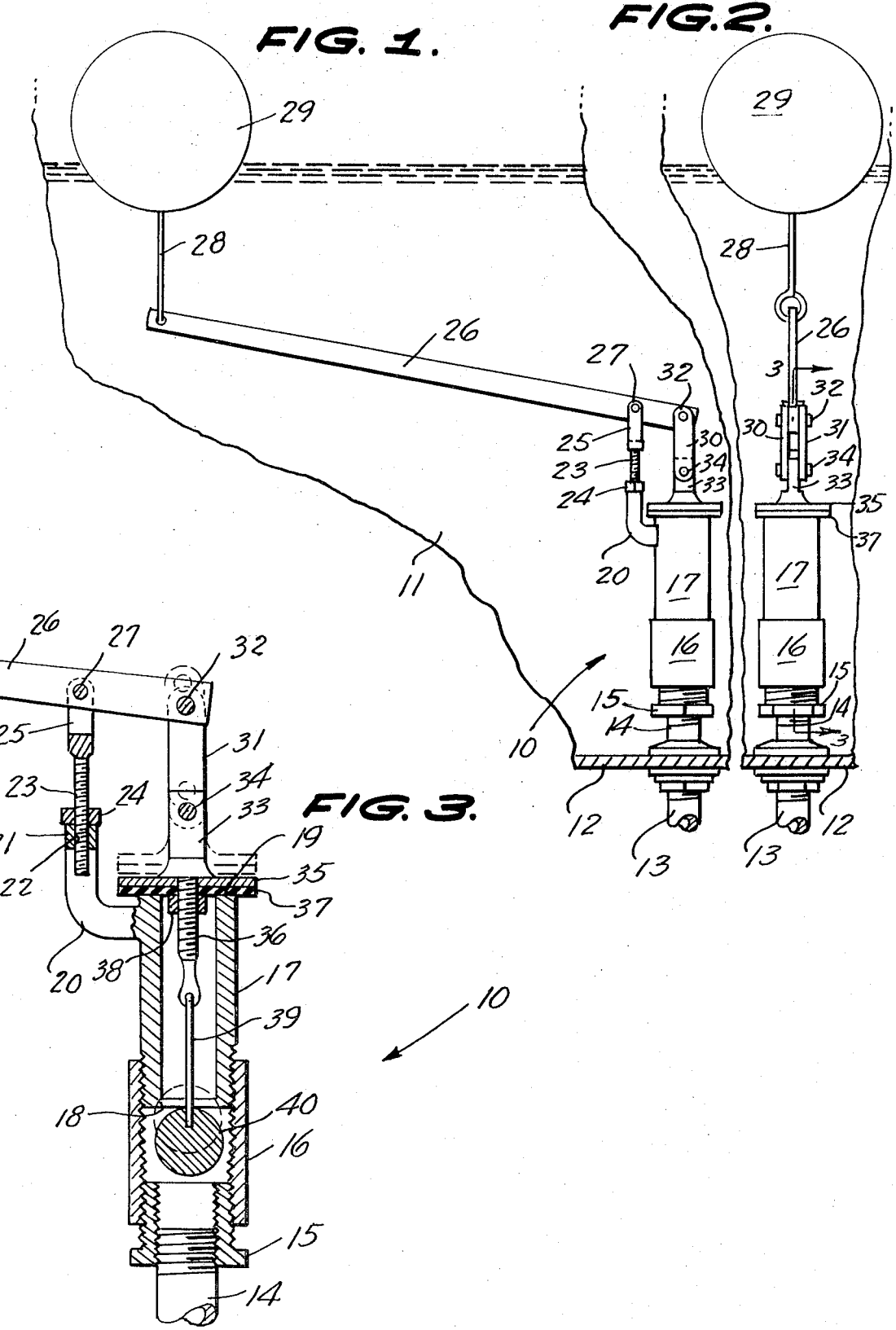

SAFETY FLOAT VALVE

BACKGROUND OF THE INVENTION

Field of the Invention

The present invention relates to safety float valves for controlling a water level.

SUMMARY OF THE INVENTION

A tank or trough is supplied by a water inlet conduit with the conduit being closed at its open end by a valve actuated by a float. A second ball valve within the conduit is adapted to close the conduit should the float sink below a certain point in the trough or tank due to loss of buoyancy or the rupturing of the tank or trough to permit all the water to flow therefrom.

The primary object of the invention is to provide a safety float valve which will prevent the flow of water under abnormal conditions when the float loses its buoyancy or the tank or trough ruptures.

Other objects and advantages will become apparent in the following specification when considered in the light of the attached drawings.

BRIEF DESCRIPTION OF THE DRAWINGS

FIG. 1 is a side elevation of the invention shown installed in a trough partially broken away and in section for convenience of illustration;

FIG. 2 is an end elevation of the structure illustrated in FIG. 1; and

FIG. 3 is an enlarged fragmentary vertical sectional view, taken along the line 3—3 of FIG. 2, looking in the direction of the arrows.

DESCRIPTION OF THE PREFERRED EMBODIMENT

Referring now to the drawings in detail, wherein like reference characters indicate like parts throughout the several figures, the reference numeral 10 indicates generally a safety float valve constructed in accordance with the invention.

The safety float valve 10 is used with an open top trough 11 having a bottom wall 12 through which a conduit extends in sealed condition supporting a pipe nipple 14 thereabove. A pipe reducer 15 is threaded onto the upper end of the nipple 14 and has an internally threaded pipe coupling 16 threaded thereon.

A pipe nipple 17 is threaded into the upper end of the coupling 16 and extends upwardly therefrom. The pipe nipple 17 is provided with a beveled valve seat 18 at its lower end.

The upper end of the pipe nipple 17 has a flat valve seat 19 formed thereacross.

An L-shaped bracket 20 is secured to the nipple 17 and extends outwardly and upwardly therefrom having a boss 21 on its upper end. The boss 21 has a bore 22 extending downwardly therefrom to receive a threaded post 23 therein. A nut 24 is threaded onto the threaded post 23 and engages against the top of the boss 21 to regulate the height of the threaded post 23 above the bracket 20. The threaded post 23 has a yoke 25 integrally formed on the upper end thereof with a lever arm 26 mounted in the yoke 25 on a pivot pin 27 extending therethrough. A link 28 is connected to the outer end of the lever arm 26 and has a float ball 29 secured thereto.

A pair of spaced parallel links 30, 31 are pivotally mounted on the inner end of the lever arm 26 by a pivot pin 32, a post 33 is pivotally mounted between the lower ends of the links 30, 31 by a pivot pin 34. A valve plate 35 is rigidly secured to the lower end of the post 33 and has a threaded rod 36 threaded axially thereon and extending perpendicularly downwardly therefrom. A rubber valve gasket 37 is engaged against the valve plate 35 around the rod 36 and is secured to the valve plate 35 by a nut 38 threaded onto the threaded rod 36. A link 39 is loosely engaged to the lower end of the threaded rod 36 and carries a ball valve 40 on its lower end. The ball valve 40 is adapted to cooperate with the seat 18 on the nipple 17 and the valve gasket 37 is adapted to cooperate with the valve seat 19 on the upper end of the nipple 17.

In the use and operation of the invention as water is used from the trough or tank 11 the float ball 29 falls to a minor degree lifting the valve gasket 37 out of contact with the seat 19. Water flowing into the conduit 13 and nipple 14 flows upwardly through the reducer 15, coupling 16 and nipple 17 out past the valve seat 19 to replenish the water in the trough 11. As the water is replenished the float 29 will rise and the valve gasket 37 will come back into contact with the seat 19 shutting off of the flow water to the tank or trough 11.

In the event the float 29 should loss its buoyancy, become detached from the lever 26 or the trough or tank 11 become ruptured to permit all of the water to flow therefrom the lever arm 26 will fall to a greater extent then that above described and the ball valve 40 will come in contact with the seat 18 at the lower end of the nipple 17 completely cutting off the flow of water from the conduit 13 to the trough or tank 11. Under these conditions the water to the trough or tank 11 will remain shut-off until serviced to correct the unusual conditions causing the shut-off.

Having thus described the preferred embodiment of the invention it should be understood that numerous structural modifications and adaptations may be resorted to without departing from the spirit of the invention.

What is claimed is:

1. A safety float valve for maintaining a desired water level in a trough or tank comprising a water conduit extending to the trough or tank, a coupling secured to said conduit within said trough or tank, a pipe nipple secured to the upper end of said coupling and said nipple having a valve seat formed on each end thereof, a lever arm adjustably mounted on said pipe nipple for pivotal movement about a horizontal pivot, a float connected to the outer end of said lever arm, a pair of valves connected to the inner end of said lever arm and positioned for cooperation with the seats at opposite ends of said nipple, said valves being spaced apart a distance greater than the distance between the seats on said valve nipple to permit said valves to engage with their respective seats with the other of said valves disengaged from its seat.

2. A device as claimed in claim 1 wherein the lower of said valve seats is beveled, and the lower of said valves is a ball normally positioned in said coupling.

3. A device as claimed in claim 2 wherein the upper of said valve seats is flat and the upper of said valves comprises a flat valve plate having a flat valve gasket mounted thereon for selective engagement with said flat valve seat.

4. A device as claimed in claim 3 wherein the means for supporting said lever arm from said nipple is vertically adjustable.

5. In a safety float valve for maintaining a desired liquid level in a trough or tank having an open top and a bottom wall, a conduit extending through said bottom wall and supporting a pipe nipple thereabove, a pipe reducer threaded onto the upper end of the nipple and having an internally threaded pipe coupling threaded thereon, a pipe nipple threaded on the upper end of the last named coupling and extending upwardly therefrom, said last named pipe nipple having a beveled valve seat in its lower end and a float valve seat in its upper end, an L-shaped bracket secured to the last named pipe nipple and extending outwardly and upwardly therefrom and having a boss on its upper end, said boss having a bore extending downwardly therefrom to receive a threaded post therein, a nut threaded onto the threaded post and engaging against the top of the boss to regulate the height of the threaded post above the bracket, said threaded post having a yoke integrally formed on the upper end thereof, a lever arm mounted in said yoke, a pivot pin extending through said lever arm, a link connected to the outer end of the lever arm and having a float ball secured thereto, a pair of spaced parallel links pivotally mounted on the inner end of the lever arm, a post pivotally mounted between the lower ends of the links, a valve plate rigidly secured to the lower end of the post and having a threaded rod threaded axially thereon and extending perpendicularly downwardly therefrom, a valve gasket engaged against the valve plate around the rod and secured to the valve plate, a link loosely engaged to the lower end of the last named threaded rod and carrying a ball valve on its lower end, said ball valve cooperating with the seat on the nipple and the valve gasket cooperating with the valve seat on the upper end of the nipple.

* * * * *